May 11, 1954
A. G. GRANT
2,678,089
JACK ACTUATED TIRE REMOVING DEVICE
Filed Dec. 19, 1952
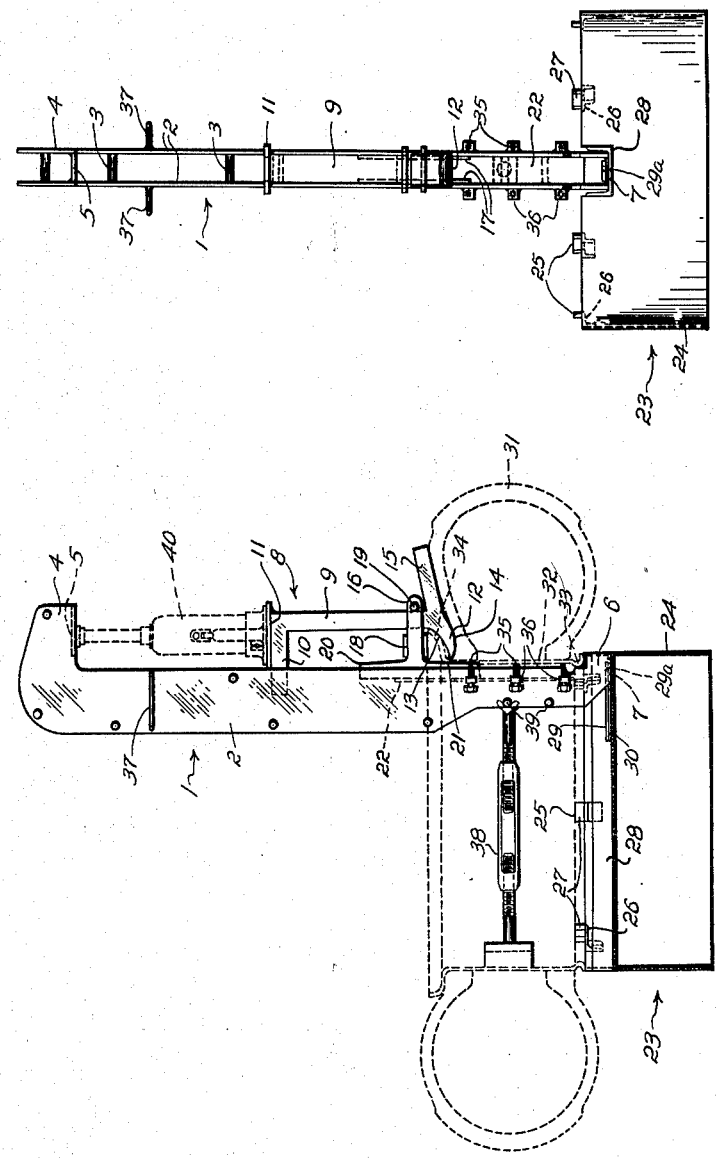
INVENTOR.
Arthur Gray Grant
BY
Attorney.

Patented May 11, 1954

2,678,089

UNITED STATES PATENT OFFICE 2,678,089

JACK ACTUATED TIRE REMOVING DEVICE

Arthur Gray Grant, New Liskeard, Ontario, Canada, assignor to Archibald Macrae Grant, New Liskeard, Ontario, Canada Application December 19, 1952, Serial No. 326,817

4 Claims. (Cl. 157—1.26)

This invention relates to a tire removing device and more particularly to a device for removing large size tires, such as are employed on heavy trucks and trailers, from their rims.

The removal of such large size tires for repair or replacement constitutes a serious problem for truck and transport operators since only the larger garages and service stations are equipped to carry out this operation, the machines presently available for this purpose being quite expensive. The small garage or service station, when confronted with the problem, must expend sometimes hours of manual effort in removing a tire. Such effort usually involves a constant hammering of the tire to loosen it from the rim, and such hammering frequently results in injury to the tire.

It is an object of this invention to provide a device for efficiently and quickly removing vehicle tires, regardless of size, from their rims, such device being of simple compact form and inexpensive manufacture.

The invention will be described with reference to the accompanying drawing, in which Figure 1 is a side elevation of a device in accordance with the invention, in operative relation to a tire and rim, and Figure 2 is a front elevation of the device.

In the drawing, 1 is a frame comprising a pair of laterally aligned elongated plates 2 fixed together in spaced relation by means of a plurality of posts 3. At one end of the frame, constituting the normal upper end thereof, the plates 2 extend laterally to form a right angular frame extension 4 on the normally forward face of the frame. Fixed within such extension 4 between the plates 2 and adjacent the lower edge thereof is a transversely extending plate 5 in right angular lateral relation to the main portion of the frame.

At the other end of the frame, constituting the normal lower end thereof, the plates 2 extend laterally to form a right angular frame extension 6 also on the normally forward face of the frame. Fixed within such extension 6 between the plates 2 and adjacent the lower edge thereof is a transversely extending plate 7 in right angular lateral relation to the main portion of the frame.

Slidably mounted in the frame is a tire-engaging lever 8 comprising a bar 9 having at one end thereof a lateral extension 10 the extremity of which is arranged to extend between the plates 2 of the frame, as shown. The width of the extension 10 is preferably but slightly less than the distance between plates 2 whereby the latter constitute a guide for bar 9 during its sliding movement in the frame. Fixed upon extension 10 is a platform 11 in substantially right angular relation to the plates 2. It will be apparent that platform 11 is in perpendicularly aligned relation to the overhanging plate 5 and parallel thereto. Platform 11 has a somewhat greater width than that of frame 1 whereby one of its edges will slidingly abut the adjacent edges of plates 2 and constitute a further guide to maintain the bar 9 in generally parallel spaced relation to the frame 1.

The other end of bar 9 has fixed thereto a laterally inclined arm 12 extending towards the frame 1. The upper face 13 of the arm 12 is curved downwardly from bar 9, while the lower face 14 is curved to present a convex tire-engaging surface, the faces 13 and 14 gradually approaching each other and terminating in a common sharp edge. A second arm 15 constituting an extension of arm 12 extends in a laterally inclined direction from bar 9 and in a direction away from frame 1.

A latch 16 comprises a pair of laterally aligned plates 17 fixed together in spaced relation by means of a transverse member 18. The forward portions of the plates 17 slidingly embrace the bar 9 and in removable relation thereto by means of a retaining pin 19 which extends through the plates and engages the forward edge of bar 9 to retain the latch in place. The pin 19 is readily removable for removal or adjustment of the latch. The rearward portions of plates 17 are each provided with complementary upper and lower wedge-shaped extensions 20 and 21. The forward edges of extensions 20 and 21 are each inclined, as shown, the angle of inclination of extensions 20 varying from that of extensions 21 to provide a choice of two wedge surfaces of different inclination. It will be apparent that the position of latch 16 may be reversed as desired to place either extension 20 or 21 in downwardly extending relation. The rearward portion of the latch extends between the plates 2 and the rearward edge of the latch engages a rail 22 fixed between plates 2 to provide a guiding track for the latch.

The device preferably includes a base 23 which comprises an annular stand 24 having a diameter not substantially larger than that of the internal diameter of most tires of the large truck type and a height not substantially less than the overall thickness of a tire of such type. A diameter of 1'7¾" and a height of 8" is generally satisfactory. A plurality of equally spaced rim support clips 25 are mounted on the stand 24 adjacent its top edge, each clip comprising a portion 26 extending radially inwardly of the stand 24 and a portion 27 extending perpendicularly from the end of portion 26. The stand 24 is also provided with a diametrically extending channel 28 recessed into the upper portion of the stand. Mounted on the bottom wall of the channel adjacent one end thereof is a frame support comprising a plate 29 having one end portion fixed to a base plate 30 and its other end portion 29a overhanging the end portion of the bottom wall of the channel and in spaced relation thereto.

Preferably, a plurality of rim supporting and positioning set screws 35 are mounted in nuts 36 fixed to the outer side surfaces of each plate 2 adjacent the lower end of the frame. It will be observed that these screws are arranged to project forwardly of the frame.

The frame 1 may be provided with handles 37.

In operation, the frame 1 is placed on the base 23 in the position shown in Fig. 1 with its plate 7 under the overhanging portion 29a of plate 29, the latter thus acting to support the frame 1 in perpendicular relation to the base, as shown. A tire, indicated at 31, for removal from its rim 32 is seated upon the base 23, the clips 25 serving to retain it in place thereon. The tire and rim are positioned with the edge portion 33, from which the usual tire retaining ring has been removed, in lower relation and the flanged edge portion 34 in upper relation. The edge portion 33 traverses and engages the upper edge of frame extension 6, the recessed supporting channel 28 permitting such engagement.

Preferably, there is provided a turnbuckle 38 having one end engaging one of a plurality of transverse posts 39 on the frame, and the other end engaging the opposite portion of the rim, to rigidly hold the frame 1 in position. The posts 39 are at various distances from the base to accommodate rims of varying width.

The sharp downwardly inclined edge portion of arm 12 is now inserted between the flanged edge 34 of the rim and the tire and is driven into substantial engagement with the bottom internal surface of the web portion of the rim by hammer blows applied to the end of 15.

The latch 16 is now actuated to retain the arm 12 in engagement with the rim and for this purpose a selected one of the wedge extensions 20 or 21 is positioned with its wedge surface in engagement with the inner surface of the rim. Since rims vary in thickness and other dimensions, it is advisable to provide a choice of two differently inclined wedges for use with rims of varying ranges of thickness. It will be apparent that the latch 16 clamps the rim between the end of arm 12 and the wedge surface of extension 20 and 21. The set screws 35 are actuated to support the rim in uniformly slightly spaced relation to the frame 1.

A jack 40 of any standard hydraulic, ratchet or gear type is seated upon the platform 11 with its upper end engaging the plate 5 of the overhanging extension 4 of the frame.

The jack 40 is now actuated to move the lever 8 downwardly and loosen the adjoining portion of the tire edge from the rim, the tire being rotated on the base from time to time to apply the device to various portions of the circumference of the tire. It will be apparent that eventually the entire tire may be removed from the rim by the downward movements of the jack and lever 8.

Since the sharpened edge of the lever arm 12 is in engagement with the internal bottom surface of the rim and since such edge is held in such engagement by the latch 16 during its downward movement, a most effective removal operation of the tire from the rim is provided, such operation having no injurious effect on the tire or rim.

There has thus been provided a tire removing device which is simple and inexpensive to construct, which is compact in size and weight, which is effective in use, and which may be easily handled and operated by one man to remove a tire from its rim in a few minutes' time.

While dimensions of the device may vary within wide limits, the following are given by way of example:

Overall height of frame 1—3'1¾"
Overall width of frame 1—8"
Overall thickness of frame 1—2¼"
Overall length of lever 8—12⅜"

What is claimed is:

1. A tire removing device comprising an elongated frame having a laterally extending portion at each end thereof, said portions extending in the same direction, one of said portions constituting a tire rim seat and the other of said portions constituting a jack engaging portion, a lever member slidingly mounted in the frame for parallel longitudinal movement thereof, a curved arm carried by and extending laterally from the end of said member adjacent said rim seat, said arm being of gradually decreasing thickness towards its free end to provide a sharpened edge on said free end for engagement with the web portion of a tire rim, a second arm carried by and extending laterally from said end of the member, said second arm being in laterally opposite relation to the first arm and extending in an opposite direction therefrom, the sides of said arms being engageable with a tire, the other end of said lever member being in adjacent opposite relation to said jack engageable portion and having a jack engageable seat thereon, an annular base, rim retaining clips mounted on the base adjacent one edge thereof, a channel carried by the base in recessed relation to said edge and arranged to receive said tire rim seat portion, said seat portion having a transversely extending plate therein, and a complementary plate fixed to the channel and having a portion arranged to overhang said transversely extending plate to retain said frame in the channel.

2. A tire removing device comprising an elongated frame having a top end, a bottom end, a jack-engageable seat adjacent said top end, and a tire rim-engageable seat adjacent said bottom end, a lever bar having a laterally extending portion at one end for slidable engagement with said frame, a laterally extending arm at its other end for slidable engagement with the web of a tire rim, and a second laterally extending arm at said other end, said second arm extending in an opposite direction to that of the first arm, a jack-engageable seat on said laterally extending portion of the lever bar and in opposed relation to said seat adjacent the top end of the frame, a latch slidably carried by said lever bar and having a portion slidably engaging said frame to hold said bar in substantially parallel relation to the frame, and adjustable means carried by the frame and engageable with a tire rim to hold the rim in spaced, parallel relation to the frame.

3. A tire removing device as defined in claim 2, said latch portion, which slidably engages the frame, having a wedge-shaped extension adapted to engage between the frame and the inner surface of the rim to thereby retain said first laterally extending arm of the lever bar in slidable engagement with the web portion of the rim.

4. A tire removing device as defined in claim 2, including a transversely extending post carried by the frame adjacent its bottom end, and a turnbuckle engageable with said posts and said rim to clamp the frame to the rim.

References Cited in the file of this patent

UNITED STATES PATENTS

| Number | Name | Date |
|---|---|---|
| 1,475,519 | Snider | Nov. 27, 1923 |
| 1,519,558 | Snider | Dec. 16, 1924 |
| 1,983,608 | Hand | Dec. 11, 1934 |
| 2,436,003 | Gosselin | Feb. 17, 1948 |
| 2,568,874 | Vanleirsberghe | Sept. 25, 1951 |
| 2,581,086 | Edenfield et al. | Jan. 1, 1952 |